United States Patent [19]
Gluntz

[11] Patent Number: 4,810,460
[45] Date of Patent: Mar. 7, 1989

[54] NUCLEAR BOILING WATER REACTOR UPPER PLENUM WITH LATERAL THROUGHPIPES

[75] Inventor: Douglas M. Gluntz, San Jose, Calif.

[73] Assignee: General Electric Company, San Jose, Calif.

[21] Appl. No.: 158,979

[22] Filed: Feb. 22, 1988

[51] Int. Cl.[4] ..................... G21C 15/02; G21C 15/18
[52] U.S. Cl. .................................. 376/282; 376/373; 376/377
[58] Field of Search ............... 376/277, 282, 370, 373, 376/377, 463

[56] References Cited

U.S. PATENT DOCUMENTS 4,755,348  7/1988  Shiralkar et al. .................. 376/282

Primary Examiner—Charles T. Jordan
Assistant Examiner—Richard W. Wendtland
Attorney, Agent, or Firm—Robert R. Schroeder

[57] ABSTRACT

In a boiling water reactor of the type having a reactor core for heating feedwater to generate a two-phase steam/water mixture and a core shroud head overlying the reactor core and defining a core upper plenum region, a plurality of conduits disposed in the upper plenum region to provide supplemental water coolant. Each conduit has at least one open end located in the primary water coolant and a conduit body that extends laterally from the open end through the core shroud head and into the plenum region. Each conduit is closed with respect to the plenum region and is filled with primary water coolant during normal operation of the reactor to provide supplemental water coolant. The supplemental water coolant drains into the reactor pressure vessel when the primary coolant level falls below the open end to cool the reactor core during a loss-of-coolant accident. In one embodiment the conduit comprises a plurality of pipes, each extending laterally from the primary water collant through the core shroud head and into the core upper plenum region. The conduit may also have a grid or array configuration to enhance mixing of the two-phase mixture in the plenum region. The invention increases the total water coolant inventory present in the reactor vessel at the occurrence of a loss-of-coolant accident by displacing some of the contents of the plenum region by the supplemental coolant.

12 Claims, 6 Drawing Sheets

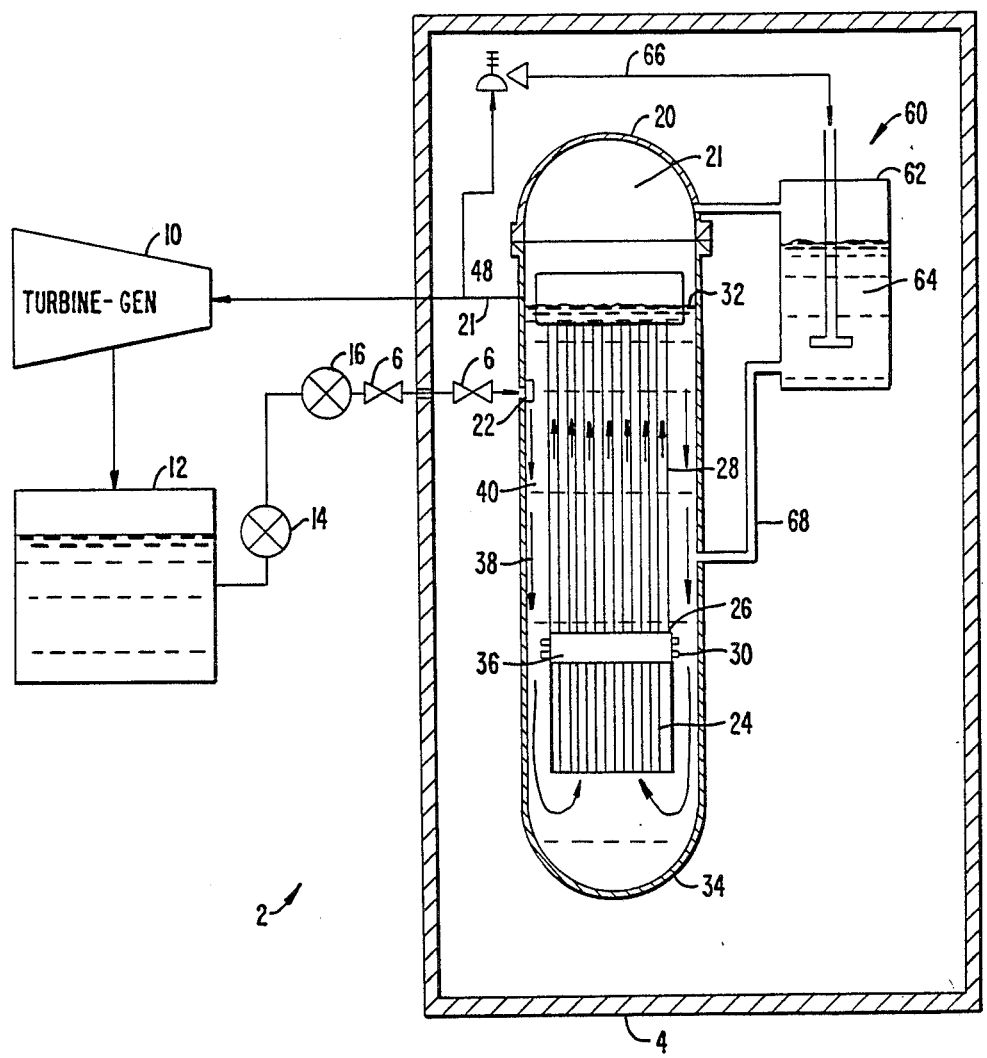
FIG._1.

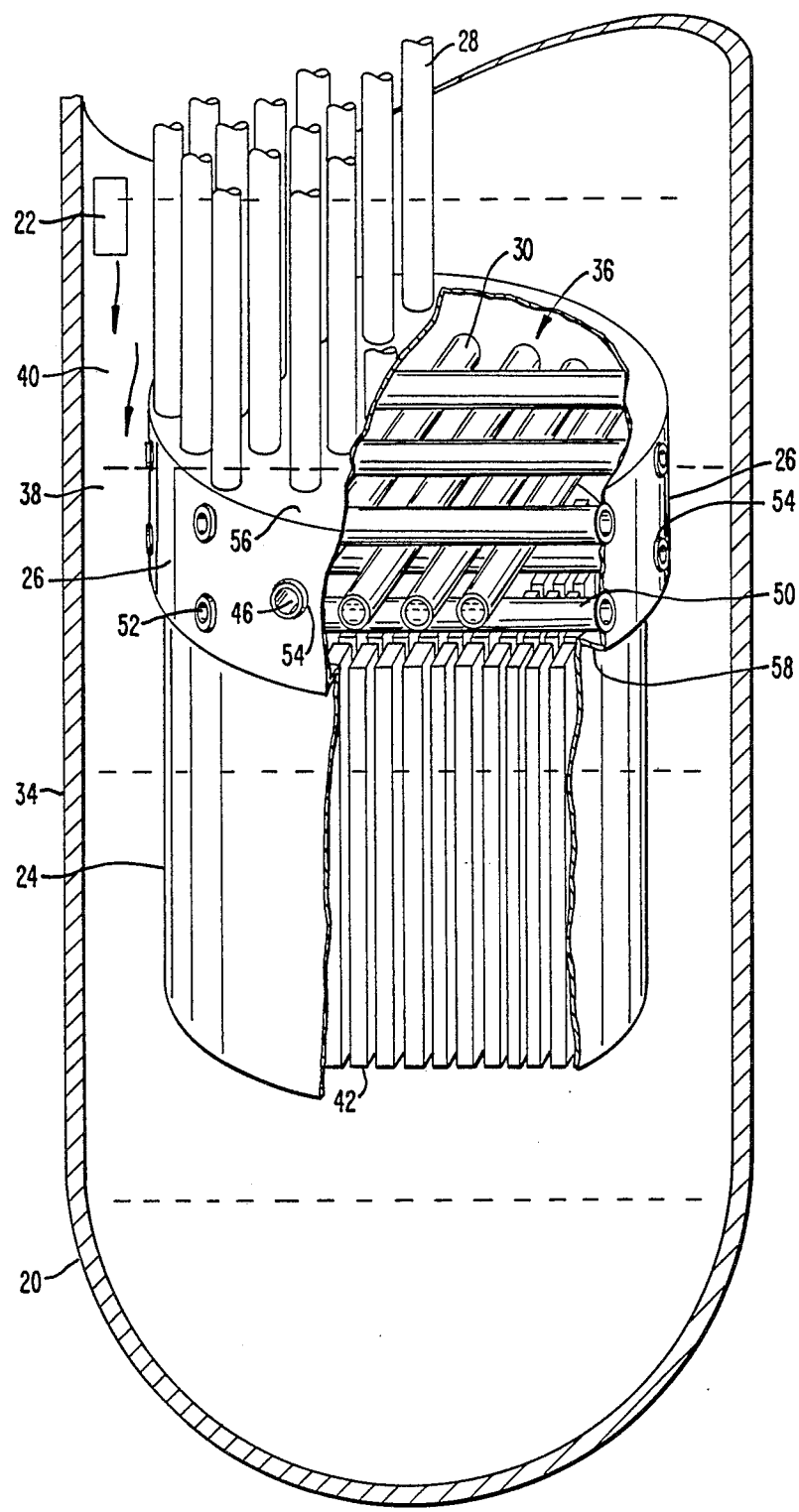
FIG._2.

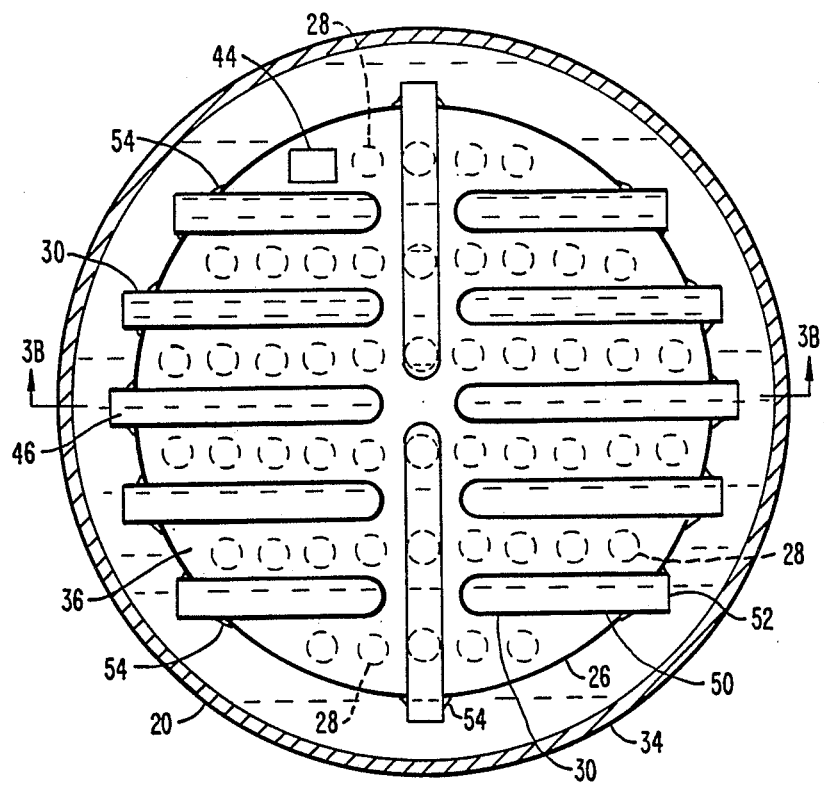
FIG.—3A.
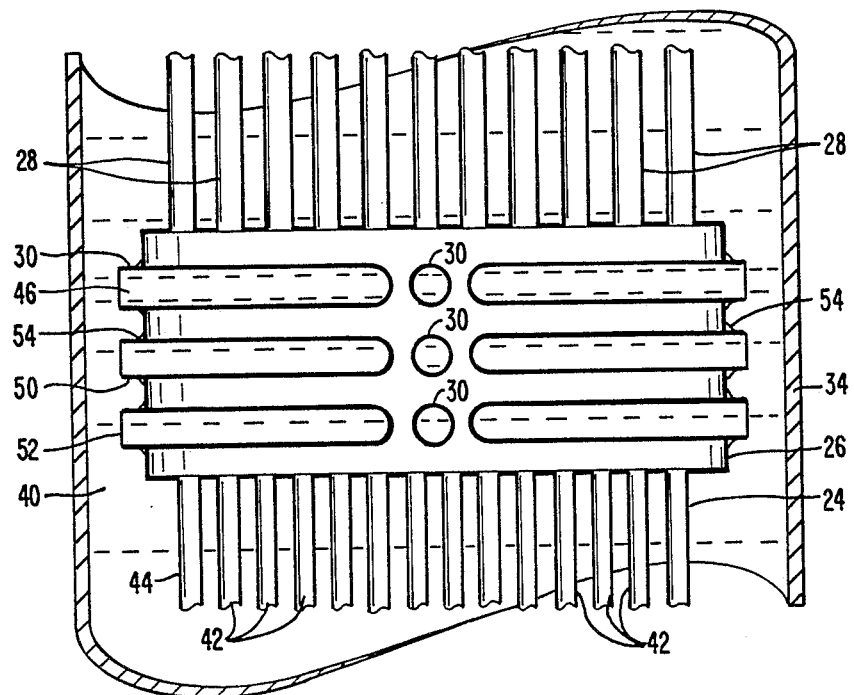
FIG.—3B.

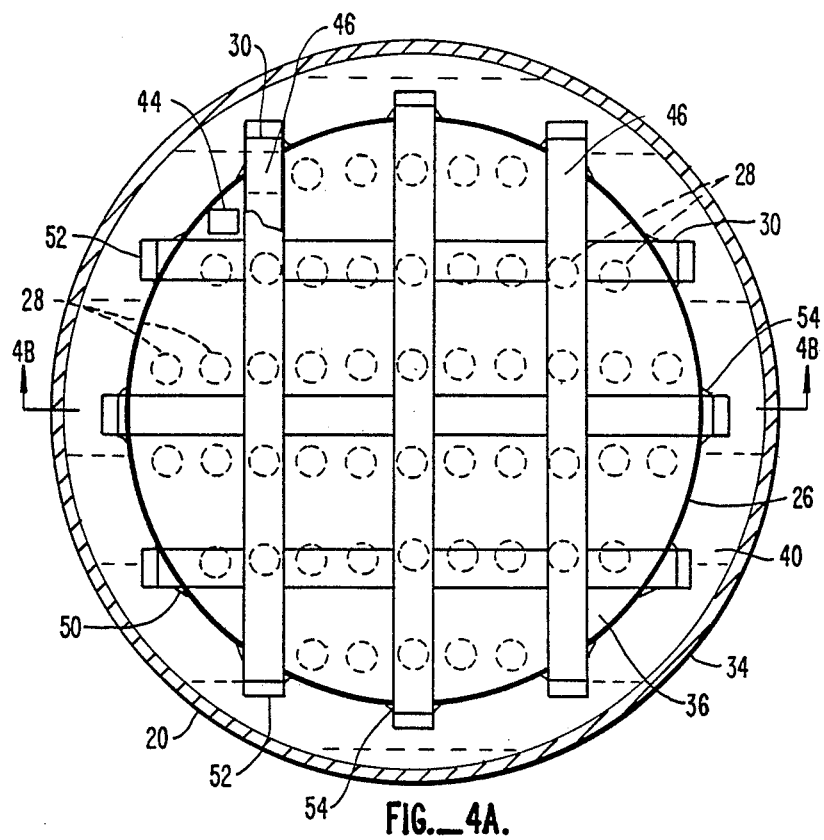
FIG._4A.
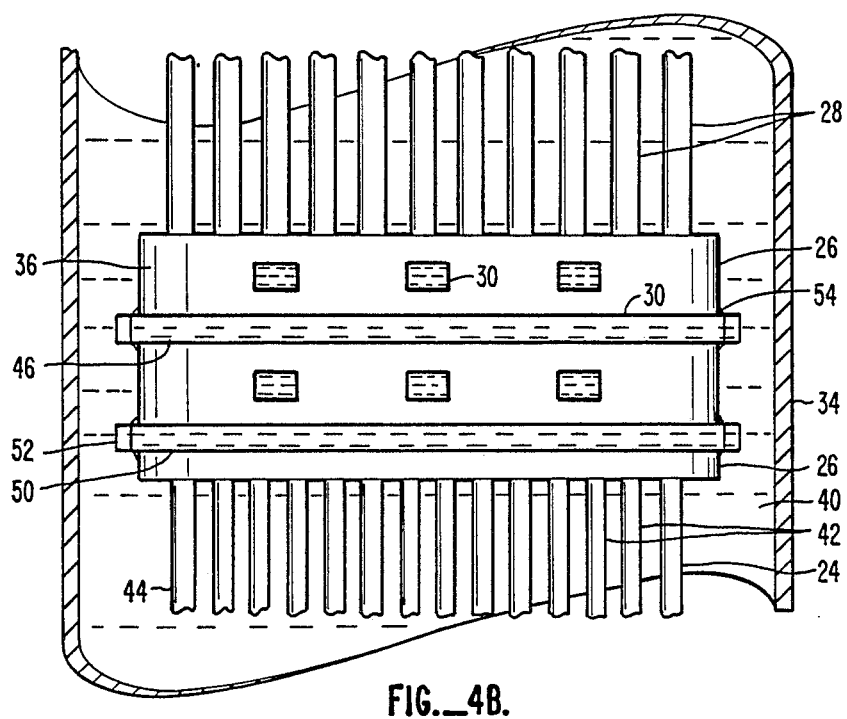
FIG._4B.

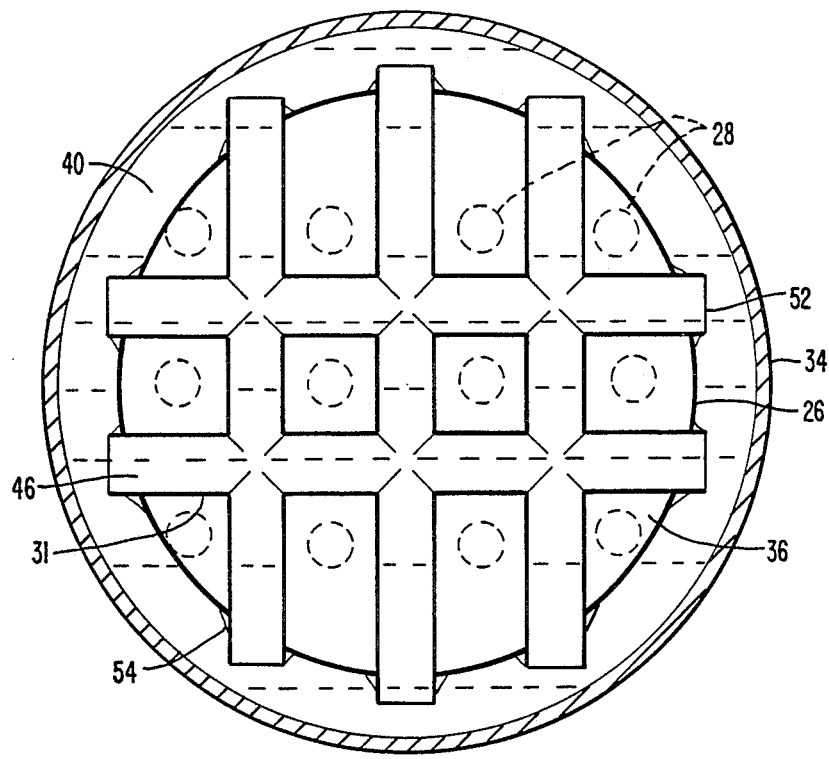
FIG._5.
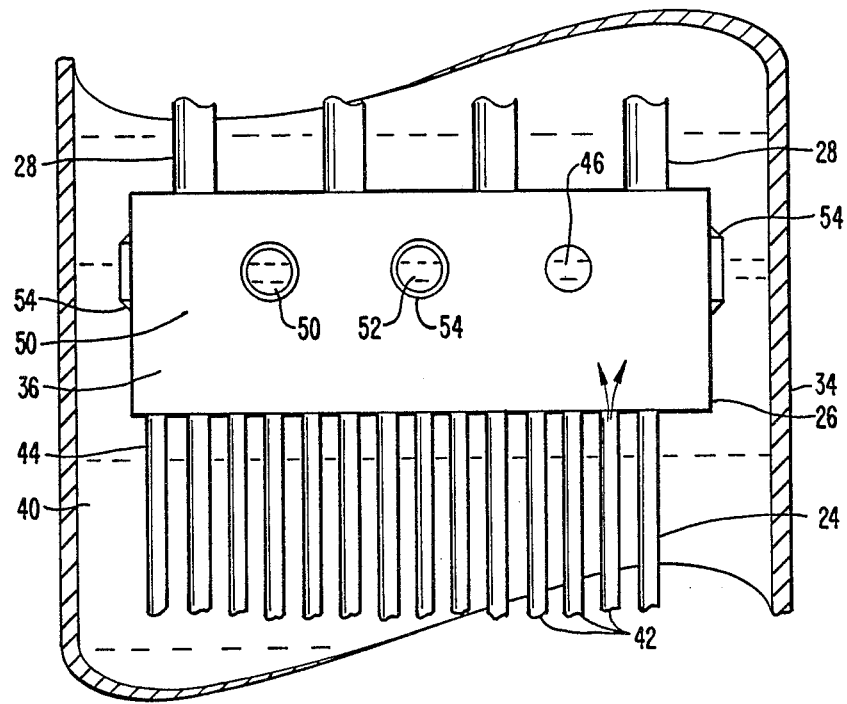
FIG._6A.

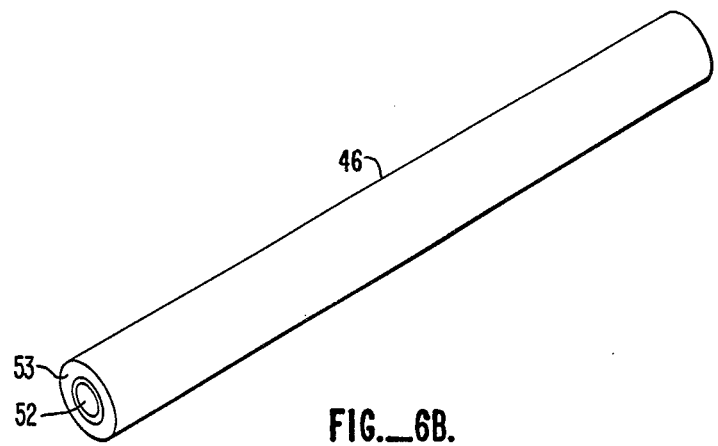
FIG._6B.
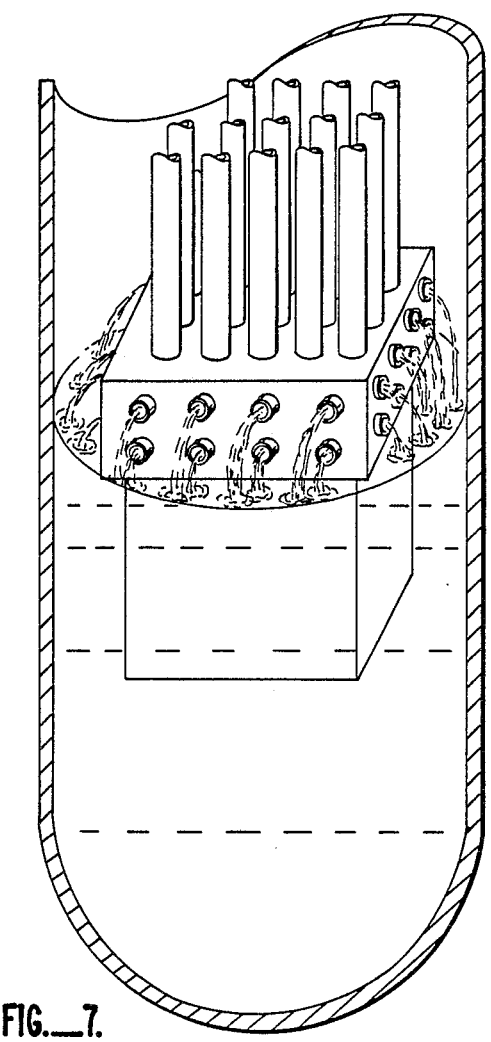
FIG._7.

NUCLEAR BOILING WATER REACTOR UPPER PLENUM WITH LATERAL THROUGHPIPES

The invention relates generally to emergency core cooling systems for nuclear boiling water reactors. More particularly the invention relates to a pipe array which is disposed in the upper plenum region of a nuclear boiling water reactor immediately overlying the core. This upper plenum region is provided with a water storage pipe matrix, which matrix is filled with supplemental water coolant during normal operation of the reactor. The plenum pipe matrix releases the supplemental water coolant to cool the reactor core following a loss-of-coolant accident.

BACKGROUND OF THE INVENTION

Many electric power generating stations employ a nuclear boiling water reactor for heating feedwater to generate steam. Typically, the steam is piped from the nuclear boiling water reactor to a turbine-generator where it is used to produce electric power. The spent steam is piped from the turbine to a condenser to generate condensate. For most conventional systems, the condensate is eventually returned to the nuclear boiling water reactor in the form of feedwater by a feedwater injection system. The feedwater is eventually re-heated by the reactor core to form steam, thereby completing the steam generation cycle.

Fuel assemblies in the reactor core heat the returned feedwater to generate a two-phase steam/water mixture. The two-phase steam/water mixture naturally rises from the core to the core shroud head. The core shroud head overlies the core and defines an upper core plenum region ("upper plenum region").

In many conventional reactors, this steam/water mixture is not produced uniformly throughout the reactor core. The upper plenum region is employed to help the steam and water form a more homogenous mix.

Standpipes exit from the top of the core shroud head or upper plenum region and convey the two-phase steam/water mixture from the upper plenum region to a steam separator assembly. The steam separator assembly classifies the steam from water in the two-phase mixture. The steam is piped to the turbine-generator. The separated water is returned to the reactor vessel and is used as a coolant for the reactor core.

The primary reactor coolant inventory consists of two components. The returned feedwater makes up part of the primary reactor coolant inventory. The separated saturated water, makes up the remainder of the primary water coolant inventory for many conventional boiling water reactors.

The separated water mixes with the return feedwater in a region near the wall of the reactor vessel called the downcomer annulus region.

This downcomer annulus region transports the coolant inventory from the top of the reactor to the bottom of the reactor along a flow path outside of the core but inside of the reactor vessel walls.

The feedwater and separated water mixture thus form the primary water coolant inventory for the reactor. During normal operation of the reactor. this primary water coolant is maintained at a normal water level above the core shroud head. The primary coolant is subject to natural circulation as it migrates down the downcomer region. Coolant circulation may be assisted by the use of forced circulation pumps.

During normal operation of the reactor, the primary coolant inventory is maintained at very high temperatures and pressures. For a boiling water reactor. the vast majority of coolant is comprised of saturated water at 546° F. and 1020 psia.

Various postulated events may cause the reactor to experience a partial loss of its coolant inventory. A subcategory of such loss-of-coolant inventory events includes loss-of-coolant accident (LOCA) events. in which an hypothesized pipe break results in the reactor coolant inventory to be expelled from the reactor due to the initial high pressure and temperature of the coolant. Isolation valves are installed on lines connecting to the reactor to prevent or at least mitigate the extent of coolant inventory loss. However, in certain other hypothetical situations, such as for pipe breaks occurring between the reactor and the pipeline innermost isolation valves, the action of isolation valve closures could not prevent the reactor from undergoing a full blowdown. Additionally, event scenarios may include an intentional reactor full controlled depressurization because of the hypothesized non-functioning of high-pressure coolant injection systems and the consequent need to depressurize promptly so that low-pressure coolant injection systems can accomplish needed coolant resupply. To prevent serious core damage given such casualty scenarios, it is necessary to design the reactor to have enough initial coolant inventory to keep the nuclear core at all times covered with coolant. This prevents the fuel rods of the nuclear fuel assemblies from heating beyond acceptable levels.

Another subcategory of loss-of-coolant inventory events includes events featuring a loss of all power to the station, in which case the reactor can be deprived of feedwater injection.

As a first mitiating action in a loss-of-coolant accident, the plant is automatically scrammed—i.e., all control rods are immediately inserted in the core to shut down the nuclear reaction. However, the reactor core will continue to generate significant quantities of decay heat even after the control rods have been inserted. Thus, some form of emergency core cooling is provided on conventional nuclear boiling water reactors to keep the fuel rods of the nuclear fuel assemblies from heating beyond acceptable levels.

Several emergency core cooling schemes have evolved to insure that the reactor core is properly cooled during a LOCA. The complement of safety grade systems that are provided as part of the nuclear steam supply system to meet these needs for adequate assured core cooling, are known as the emergency core cooling system (ECCS). For example, one BWR product line produced by GE Nuclear Energy uses both high-pressure as well as low-pressure injection of water as major elements comprising its ECCS. Considerable energy must be expended during the casualty to effect the required high-pressure injection of coolant. ECCS systems providing these high pressures must be brought on line while the casualty is occurring. In addition, these systems depend on the long term operation of power supplies such as emergency diesel generators and connected electrical pumps and are therefore expensive when designed to the required margins of reliability.

Advanced designs such as the simplified boiling water reactor (SBWR) seek to avoid reliance on pumping systems during a LOCA. These systems employ in new ways the large pool of water known as a "suppression pool" which is connected by pipes to the reactor.

The suppression pool in the SBWR design is located within the reactor containment at an elevation higher than the core. The water in the suppression pool can now be used to flood the reactor core by gravity action alone after the reactor has depressurized following a LOCA.

The SBWR ECCS now consists of the aforesaid suppression pool, plus the aforesaid injection lines which connect the suppression pool to the reactor, plus depressurization subsystem. Several limitations arise in connection with this conventional SBWR ECCS. First, the depressurization subsystem is required to reduce reactor pressure very rapidly. In addition, an adequate initial inventory of reactor coolant must be contained within the reactor vessel to counterbalance the coolant inventory lost because of flashing during depressurization. The initial water inventory must be such that the residual water inventory after flashing will keep the core covered by coolant until additional water is gravity injected by the suppression pool. As a result, the SBWR is required to have more initial water inventory than is needed by a conventional BWR. Approximately 15 to 20 feet of extra reactor vessel height is required to meet the needs for emergency core cooling for the SBWR.

For SBWR, this 15- to 20-foot region is also used as a chimney that promotes coolant circulation through the fuel assemblies. The two-phase steam/water mixture generated by heating water in the reactor core naturally up-flows through this region from the reactor core through standpipes to a steam/water separator assembly. Saturated liquid separated from the two-phase mixture by the steam separator assembly is discharged back into the reactor region external to the chimney. The discharged saturated water then flows at low velocities back into the reactor downcomer where it undergoes mixing with the cooler feedwater being returned to the reactor. The now-mixed coolant is at reactor pressure and is 20° to 30° subcooled, and so is still extremely hot. Because of its high temperature, a substantial fraction of this "hot" coolant will flash into steam during reactor depressurization following a LOCA.

For reactor coolant initially at 546° F. and 1020 psia, depressurization of the reactor to 212° F. and atmospheric pressure following a LOCA will result in approximately one-third of the water mass being flashed as steam and two-thirds remaining as water. The additional reactor vessel height and volume required to compensate for this coolant inventory lost due to flashing during depressurization of the reactor leads to a substantial increase in the capital cost of the nuclear island portion of the power station.

SUMMARY OF THE INVENTION

The invention provides an improved nuclear boiling water reactor having an increased margin of safety against core uncovery following a LOCA.

According to the invention there is provided a conduit for receiving primary water coolant during normal operation of the reactor. The conduit has at least one open end located in the primary water coolant and a conduit body that extends from the open end through the core shroud head and into the upper plenum region. The conduit is closed with respect to the upper plenum region. The conduit is filled with primary water coolant during normal operation of the reactor to provide supplemental water coolant. The conduit releases this supplemental water coolant into the reactor vessel to cool the reactor core following a LOCA or a similar coolant emergency.

In one embodiment the conduit comprises a plurality of pipes extending laterally from the downcomer annulus region through the core shroud head and into the upper plenum region. In an alternative embodiment, the conduit has a grid or array configuration which homogenizes the two-phase steam/water mixture as it flows up through the upper plenum region.

In another embodiment, the pipes completely traverse the upper plenum region.

In essence, the invention increases the total water coolant inventory present in the reactor vessel at the occurrence of a LOCA by displacing some of the two-phase mixture contained in the upper plenum region.

Further objects and features of the invention will become apparent by reference to the following brief description of the drawings, the detailed description of the drawings and the appended claims.

BRIEF DESCRIPTION OF THE DRAWINGS

FIG. 1 is a diagram of a nuclear power generating system including a nuclear reactor and a return feedwater injection system according to the invention;

FIG. 2 is a detailed three dimensional view of a core shroud head overlying a reactor core and having a conduit array disposed therein according to another embodiment of the invention;

FIG. 3A is a top view of a pipe array disposed in a reactor vessel according to another embodiment of the invention.

FIG. 3B is a front view of the embodiment shown in FIG. 3A.

FIG. 4A is a top view of a channel array disposed in a reactor vessel according to one embodiment of the invention.

FIG. 4B is a side view of the embodiment shown in FIG. 4A.

FIG. 5 is a top view of a conduit grid disposed in a reactor vessel according to one embodiment of the invention.

FIG. 6A is a side view of a single row of lateral throughpipes disposed in a reactor vessel according to one embodiment of the invention.

FIG. 6B is a three-dimensional view of an insulated pipe for use in various embodiments of the invention.

FIG. 7 is a stylized pictorial illustration of supplemental water coolant draining from a plurality of pipes into the reactor vessel downcomer annulus region according to the invention.

DETAILED DESCRIPTION OF THE DRAWINGS

FIG. 1 shows a nuclear power generation system 2 having a nuclear boiling water reactor 20. The boiling water reactor 20 includes a reactor core 24 which heats water contained in the reactor pressure vessel 34 to generate a two-phase steam/water mixture. The core contains a plurality of fuel assemblies (not shown) which generate heat within the core by conventional nuclear fission and associated radioactive decay processes. The fuel assemblies in the central region of the core 24 tend to generate higher quantities of steam in the two-phase mixture than do the fuel assemblies located near the periphery of the core. The two-phase steam/water mixture naturally flows up from the core into a core shroud head 26 overlying the core. The core shroud head 26 encloses and defines an upper plenum region 36. Core shroud head 26 is a conventional core shroud head, being essentially a cylinder with a circular open bottom that overlies the core and a circular closed top from which a plurality of standpipes 28 extrude with cylindrical side walls herebetween.

The core shroud head 26 is separated from the fuel assemblies in the core 24 by a suitable distance to permit additional mixing of the steam and water. This distance is about 5 feet for a typical GE natural circulation simplified boiling water reactor. Natural, turbulent mixing occurs between the plumes of adjacent fuel assemblies as the steam/water mixture traverses upper plenum region 36. This natural mixing leads to increased uniformity in the steam/water mixture. However, complete uniformity at the top of the core shroud head 26 is not obtained even with the 5 foot separation.

A plurality standpipes 28 exit the upper plenum region 36 from the top of the core shroud head 26. The standpipes 28 convey the two-phase mixture to a steam separator assembly 48. The steam separator assembly 48 classifies the steam from water to produce steam and separated water. The separated steam travels from the separator assembly 48 through an outlet to pipes going to the turbine-generator 10. The separated water is discharged back into the reactor pressure vessel 34 and eventually migrates into the downcomer annulus region 38.

The preferred embodiment here illustrated includes standpipes 28 and steam separator assemblies 48. The reader will understand some reactors to which this invention is applicable include a simple chimney. Further, steam separators may be omitted altogether in favor of a region in the reactor where free-surface steam/water separation occurs.

Referring still to FIG. 1, as earlier mentioned the separated steam is piped from an outlet of the reactor pressure vessel 34 to a turbine-generator 10. The turbine-generator 10 produces electric power using the high energy content of the steam and discharges the spent steam to a condenser 12. Condenser 12 cools the steam to produce condensate. A condensate pump 14 is coupled to an outlet of condenser 12 and pumps cool return feedwater to a feedwater pump 16. Feedwater pump 16 injects the returned feedwater into the reactor pressure vessel 34 at a sparger 22. The returned feedwater thereafter flows into the downcomer region 38 where it mixes with hot separated water from the steam separator 48. The mixed feedwater and hot separated water form the primary water coolant. The primary water coolant is contained in the reactor pressure vessel up to a normal water level 32 which is generally 20 feet higher than the top of the core shroud head 26 in the embodiment shown in FIG. 1.

FIG. 1 also shows a plurality of conduits 30 disposed in the reactor pressure vessel 34 according to the invention. The features and operation of conduits 30 will be explained hereafter by reference to FIGS. 2-7.

FIG. 1 also shows a gravity-driven cooling system 60. Both the gravity-driven cooling system 60 and the reactor 20 are located inside the reactor containment 4. The gravity-driven cooling system includes a suppression chamber 62 which contains an initial inventory of cool emergency coolant in the configuration of a suppression pool 64. The suppression pool is typically located about 30 feet above the reactor core, has a height of about 18 feet, and a volume of about 170.000 cubic feet. The gravity-driven cooling system 60 also includes an input line 66 and an output line 68. Input line 66 consists of pipes and valves which connect the main steam line 21 with suppression chamber 62 having exhausts below the water level of suppression pool 64. During depressurization of the reactor following a LOCA, input line 66 communicates some of the flashed coolant into suppression pool 64. Output line 68 consists of pipes and valves which connect the bottom of suppression pool 64 with the interior of the reactor pressure vessel 34. During depressurization of the reactor following a LOCA, output line 68 discharges emergency coolant comprising suppression pool 64 into the downcomer region 38 at a height above the core shroud head 26. However, suppression pool 64 discharges the emergency coolant only after the reactor pressure vessel is depressurized to a pressure level below the gravitational head produced corresponding to the elevated position of suppression pool 64.

FIG. 2 is a detailed three dimensional representation of one embodiment of the invention. FIG. 2 shows a portion of a nuclear boiling water reactor 20. The nuclear boiling water reactor 20 includes a reactor pressure vessel 34 that contains primary water coolant 40. The primary water coolant 40 surrounds a reactor core 24, a core shroud head 26, and standpipes 28. The core shroud head defines and encloses an upper core plenum region 36 and has a substantially open bottom 58 that overlies the core 24. The primary coolant 40 is isolated from the upper plenum region 36. The reactor preesure vessel 34 contains primary water coolant 40 up to a normal water level which extends about 25 feet above the top 56 of the core shroud head 26 toward a steam separator assembly (not shown). The primary water coolant 40 is comprised of separated saturated water and returned feedwater that is injected into the reactor vessel 34 at feedwater sparger 22.

The reactor core 24 includes a plurality of fuel assemblies 42. The fuel assemblies 42 contain fuel rods (not shown) that heat water to generate a two-phase steam/water mixture. As previously discussed, this steam/water mixture naturally flows up from the reactor core 24 into the upper plenum region 36.

The core shroud head 26 is a cylindrical housing in the embodiment shown; top 56 and bottom 58 are circular in shape. A typical core shroud head has a height of about 5 feet and a diameter of about 18 feet.

A core bypass 44 discharges coolant into the upper plenum region 36 at the bottom 58 of core shroud head 26. The core bypass 44 conducts reactor coolant from the lower core plenum. The core bypass coolant is comprised mostly of saturated liquid with only a small amount of steam. The core bypass coolant mixes with the two-phase steam/water mixture in the upper plenum region 36.

Referring still to FIG. 2 there is shown a plurality of standpipes 28 which connect to, and exit the top 56 of core shroud head 26. The plurality of standpipes 28 conduct the steam/water mixture from the upper plenum region 36 to the steam separator assembly, (not shown).

A plurality of conduits 30 are disposed in the core shroud head 26 and traverse the upper plenum region 36 according to the invention. Each conduit 30 is a "throughpipe" having open ends 52 and a conduit body 50. Each conduit body 50 penetrates the core shroud head 26, traverses the upper plenum region 36, and reexits the core shroud head 26 approximately 180 degrees from the point of entry. Each of the plurality of throughpipes 30 is disposed horizontally in the reactor vessel 34. Each throughpipe 30 terminates in opposing open ends 52 which are located in the primary water coolant 40. Each throughpipe 30 is completely sealed or closed with respect to the upper plenum region 36 by a seal 54. Seal 54 may be for example a weld which is formed around the throughpipe at the junction where it penetrates the core shroud head 26. Seal 54 prevents the bypass coolant and two-phase mixture contained in the upper plenum region 36 from migrating into the throughpipes 30 and the primary coolant 40. Seal 54 also prevents primary coolant from migrating into the upper plenum region 36.

The conduits 30 are disposed in alternating orthogonal rows. There are four discrete rows with the throughpipes 30 of each row at right angles through pipes of adjacent rows. The alternate direction of the throughpipes 30 facilitates mixing of the steam/water mixture as it passes through the upper plenum region 36. Since the diameter of the core shroud head (18 feet) is over 3 times the height (5 feet), the invention is very amenable to configurations having a larger number of conduits disposed in the two lateral directions than the number of rows in the vertical direction.

During normal operation of the reactor, primary water coolant 40 will flow into each of the throughpipes 50 through the open ends 52 to provide a quantity of supplemental water coolant 46 in each pipe. As previously mentioned, the throughpipes 30 and the primary water coolant are totally sealed or closed with respect to the upper plenum region to prevent leakage of upper plenum coolant into the downcomer annulus and to prevent leakages from the reactor vessel or pipes into the upper plenum region.

As the reactor vessel is initially filled with primary water coolant 40, water will naturally flow into and fill the conduits 30 as the level of the primary water coolant 40 successively reaches the level of the open ends 52. Primary water coolant 40 will fill the conduits 30 by a totally passive action requiring no moving parts, pumping, switching, or valving action.

FIG. 3A shows a top view of another embodiment of the invention. As shown in FIG. 3A, a reactor vessel 34 includes a quantity of primary water coolant 40. A cylindrical shaped core shroud head 26 defines an upper plenum region 36. FIG. 3A also shows a plurality of standpipes 28 and a core bypass 44. A plurality of pipe shaped conduits 30 are shown disposed in core shroud head 26. Each pipe 30 has an open end 52 located in the primary water coolant 40 and a conduit body 50. Each conduit body 50 extends laterally from the primary water coolant 40, penetrates the core shroud head 26, and extends laterally into partially across the upper plenum region 36. A first plurality of pipes 30 is shown laterally disposed in a first lateral direction y and a second plurality of pipes 30 is shown laterally disposed in a second lateral direction x. Direction y is orthogonal to direction x in the disclosed embodiment. Two rows having 5 pipes each are disposed in the y direction. A single row having two pipes is disposed in the x direction. The row in the x direction separates the two rows in the y direction and is disposed along an axis of the core shroud head 26 which runs in the y direction.

FIG. 3B is a front view of the embodiment of the invention shown in FIG. 3A. As shown in FIG. 3B, the plurality of pipes 30 do not totally traverse the upper core plenum region 36. For the embodiment shown in FIGS. 3A and 3B, pipes disposed in the first and second lateral directions are aligned directly over or under corresponding pipes disposed higher or lower in the core plenum region 36.

Refer now to FIG. 4A. FIG. 4A is a top view of another embodiment of the invention showing a reactor pressure vessel 34 containing primary water coolant 40. A core shroud head 26 encloses and defines an upper plenum region 36. Also shown is a bypass flow 44 which empties bypass coolant into the upper core plenum region 36. A plurality of standpipes 28 exit the top of core shroud head 26 and convey steam and water to steam separators, (not shown).

The embodiment of FIG. 4A includes a plurality of channel shaped conduits 30, each having a square or a rectangular cross section. Each channel shaped conduit has a conduit body 50 and open ends 52. Each open end is disposed in the primary water coolant 40. Each conduit body extends laterally from the open end, penetrates the core shroud head 26, traverses the upper plenum region 36, re-exits the core shroud head 26, and terminates at an open end 52 approximately 180 degrees from the entry open end 52.

A first plurality of channel shaped conduits 30 totally traverse the upper core plenum region 36 in a first lateral direction y. A second plurality of conduits 30 underlie the first plurality of conduits and totally traverse the upper core plenum region 36 in a second lateral direction x. Second direction x is orthogonal to first direction y. The first and second plurality of conduits form a conduit array similar to a three dimensional mesh.

FIG. 4B is a side view of the embodiment of the invention shown in FIG. 4A. As shown in FIG. 4B the plurality of conduits 30 disposed laterally in the y direction totally traverse the upper plenum region. These "throughchannels" alternately overlay and underlie the second plurality of throughchannels 30 disposed in the x direction.

FIG. 5 is a top view of a conduit grid 31 disposed in a core shroud head 26 according to another embodiment of the invention. A single conduit grid 31 is shown disposed inside the core shroud head 26 and the upper plenum region 36. The conduit grid 31 may be cast as an integral part of the core shroud head 26 when the core shroud head 26 is fabricated. Alternatively, core shroud head 26 may be fabricated in sections into which the grid 31 is inserted. Thereafter, the shroud head sections and grid could be welded together to provide a leak proof grid and upper plenum region. A plurality of such grids 31 may be stacked in the core plenum region according to another embodiment of the invention.

During normal operation of the reactor, primary water coolant is maintained in the reactor up to the normal water level which extends some distance above the core shroud head. By totally passive action, primary water coolant flows into the open end of each conduit. The primary water coolant fills each conduit with a quantity of primary water coolant, hereafter referred to as "supplemental water coolant." Conduit configurations according to several of the embodiments of the invention disclosed herein facilitate and enhance mixing of the two-phase mixture as it flows from the reactor core through the upper plenum region into the standpipes. Flow of the two-phase mixture over the conduits gives the steam and water mixture a more uniform velocity and density. As a result, the two-phase mixture is characterized by more uniform hydrodynamic qualities (i.e. is homogenized) upon entrance to the steam separator standpipes. The configuration of the conduit arrays may be chosen by evaluating the necessary core shroud head alterations, the volume of supplemental coolant provided, and the enhanced steam/water characteristics.

During a LOCA the invention operates as follows. First, the reactor vessel is depressurized following a reactor scram sequence. As a result of depressurization, flashing of the "hot" primary water coolant will occur resulting in a substantial loss of coolant inventory in the form of steam. Over time, the water level in the reactor pressure vessel will fall and eventually will drop below the open ends of the conduits containing the supplemental water according to the invention. As the primary water coolant level falls below each open end, residual water (i.e., non-flashed supplemental coolant) occupying the conduits will passively and naturally flow by gravity action alone from the conduits into the downcomer region to assist in covering the reactor core.

FIG. 7 is a stylized pictorial illustration of one embodiment of the invention in operation during a LOCA. As shown in FIG. 7 the level of hot coolant inventory in the reactor pressure vessel has fallen below the open ends of the conduits disposed in the core shroud head. Rows of conduits are disposed laterally at each of a plurality of vertical levels. As the primary water coolant within the downcomer annulus falls below each row, the pipes at that level will drain their supplemental coolant into the reactor vessel downcomer annulus. Pipes may be located at vertical elevations to permit outflow of supplemental coolant as soon as feasible. Pipes may be located horizontally to optimize homogenization and up flow of the two-phase mixture.

According to the invention, supplemental water coolant drains from the conduits into the reactor pressure vessel to assist in covering the reactor core following a LOCA. The number and the size of the open ends, and the number, the shapes, and the array configuration for the conduits and the number of rows and columns would be dictated by overall design considerations.

By providing the supplemental water coolant according to the invention, the invention provides additional water coolant inventory within the reactor pressure vessel at the initial occurrence of a LOCA. By providing the supplemental water inventory in the upper plenum region according to the invention, additional water coolant is provided without any necessary increase in the dimensions of the reactor pressure vessel, the containment, or the normal water level. Further, by disposing the conduits within the core shroud head, the invention enhances the hydrodynamic flow properties of the two-phase mixture as it rises from the reactor core to the standpipe assembly. The additional supplemental water coolant inventory permits other reactor dimensions to be made more compact, notwithstanding the marginal nature of the additional water inventory. Moreover, this marginal supplemental water inventory increase provides a useful margin against the threat of core uncovery following a LOCA until additional cooling is provided by a primary emergency core cooling system.

Although the invention has been described with reference to the foregoing embodiments and drawings, it should be understood that variations and modifications may be made to the foregoing without departing from the scope of the invention. For example, the invention is not limited in its application to a simplified boiling water reactor or a naturally cooled or natural circulation boiling water nuclear reactor. The invention may be used with emergency core cooling systems other than a gravity-driven cooling system. The conduits used may have other shapes or array configurations without departing from the scope of or spirit of the invention. The number and sizes of the conduits may be simplified such as by providing only one row of conduits as shown in FIG. 6A. The conduits may be insulated as shown in FIG. 6B to minimize heat transfer to the supplemental coolant from the two-phase mixture as it rises through the upper plenum region.

Furthermore, although the pipes are laterally disposed according to the disclosed embodiments, it would be apparent to one skilled in the art to modify the invention so that the main conduit body is disposed in some other fashion, for example vertically, in the upper plenum region. According to this embodiment a closed pipe may be disposed into the upper plenum region to form a mini tank into which a quantity of supplemental coolant is received. Open ends would be disposed at the bottom and at the top of the tank and would extend laterally from the primary coolant into the upper plenum region. The open ends would permit inflow and outflow of coolant.

Other modifications, variations and combinations may be made therefore without departing from the scope and spirit of the invention. Accordingly, it should be understood that the invention is therefore limited only by the appended claims.

What is claimed is:

1. In a boiling water nuclear reactor of the type comprising:
    a reactor vessel;
    a reactor core for heating water contained in said reactor vessel to generate a two-phase steam/water mixture;
    a core shroud head defining a plenum region for receiving said two-phase mixture;
    a steam separation region for classifying steam from water in said two-phase mixture and for returning separated water to said core;
    means for conveying said two-phase mixture from said plenum region to said steam separation region; and
    primary water coolant for cooling said reactor core, said primary water coolant comprising said separated water and feedwater, said primary water coolant normally contained in said reactor vessel at a level above said core shroud head, the improvement comprising:
    conduit means for receiving said primary water coolant;
    said conduit means having at least one open end located in said primary water coolant and a conduit body extending laterally from said at least one open end through said core shroud head into said plenum region;
    said conduit means being closed with respect to said plenum region and filled with primary water coolant during normal operation of said reactor, whereby supplemental water coolant is provided for cooling said reactor core during a loss-of-coolant accident.

2. The improvement of claim 1 and wherein said supplemental water coolant drains into said reactor vessel to cover said reactor core when said primary water coolant level falls below said at least one open end.

3. The improvement of claim 1 and wherein said conduit body traverses said plenum region and reexits said core shroud head.

4. The improvement of claim 1 and wherein said conduit means comprises a plurality of pipes, each said pipe extending laterally from said primary water coolant through said core shroud head into said core plenum region.

5. The improvement of claim 1 and wherein said conduit means comprises a conduit array.

6. An improved boiling water reactor comprising:
a reactor vessel;
a reactor core for heating water contained in said reactor vessel to generate a two-phase steam/water mixture;
a steam separation region for classifying said steam from said water in said two-phase steam/water mixture and returning separated water to said core;
a core shroud head overlying said core and defining a plenum region for receiving said two-phase mixture from said reactor core;
means for conveying said two-phase mixture from said core shroud head to said steam separator region;
primary water coolant for cooling said reactor core. said primary water coolant comprising said separated water and feedwater, said primary water coolant normally contained in said reactor vessel at a level above said core shroud head; and
conduit means for receiving said primary water coolant, said conduit means having an open end located in said primary water coolant and a conduit body extending from said open end through said core shroud head into said plenum region, said conduit means being closed with respect to said plenum region and filled with primary water coolant during normal operation of said reactor to provide supplemental water coolant, said supplemental water coolant draining into said reactor vessel when said primary coolant level falls below said open end, whereby said reactor core is cooled by said supplemental water coolant during a loss-of-coolant accident.

7. The invention of claim 1 or 6 and wherein said conduit means includes:
a top open end and a bottom open end, each located in said primary water coolant and extending laterally through said shroud wall body into said upper plenum region; and
a conduit body connecting said top open end and said bottom open end.

8. The invention of claim 1 or 6 and wherein said conduit means is configured to homogenize said two-phase mixture.

9. The invention of claim 1 or 6 and wherein said nuclear reactor is a natural circulation boiling water nuclear reactor.

10. The invention of claim 1 or 6 and wherein said reactor vessel is coupled to a gravity-driven cooling system.

11. The invention of claim 1 or 6 and wherein said conduit means is thermally insulated.

12. In a nuclear boiling water reactor of the type having a reactor core for heating water to generate a steam/water mixture, a core shroud head overlying said core and defining a core upper plenum region, and a primary water coolant inventory normally contained in said reactor to a level above said core shroud head, a method of cooling said reactor comprising the steps of:
disposing conduit means in said reactor, said conduit means having an open end located in said primary coolant and a conduit body that extends laterally from said open end through said core shroud head into said plenum region;
closing said conduit body and said primary coolant with respect to said plenum region;
filling said conduit means with primary coolant during normal operation of said reactor to provide supplemental water coolant; and
releasing said supplemental water coolant into said reactor during a loss-of-coolant accident.

* * * * *